United States Patent [19]

Baugh et al.

[11] Patent Number: 4,711,326

[45] Date of Patent: Dec. 8, 1987

[54] SLIP GRIPPING MECHANISM

[75] Inventors: John L. Baugh, Huntsville; Joe Foster, Spring, both of Tex.

[73] Assignee: Hughes Tool Company, Houston, Tex.

[21] Appl. No.: 876,515

[22] Filed: Jun. 20, 1986

[51] Int. Cl.[4] .................... B65H 59/10; E21B 23/04; E21B 7/18
[52] U.S. Cl. ..................................... 188/67; 166/212; 166/217; 175/423
[58] Field of Search .............. 188/67, 151 R, 151 A, 188/195, 265; 166/212, 217, 208, 209, 138; 175/423

[56] References Cited

U.S. PATENT DOCUMENTS

| | | | |
|---|---|---|---|
| 2,877,850 | 3/1959 | Burns | 166/124 |
| 2,879,851 | 3/1959 | Wilson | 166/138 |
| 3,013,610 | 12/1961 | Conrad | 166/212 X |
| 3,528,500 | 9/1970 | Brown | 166/217 |
| 4,311,196 | 1/1982 | Beall et al. | 166/134 |
| 4,437,517 | 3/1984 | Bianchi et al. | 166/212 X |
| 4,440,223 | 4/1984 | Akkerman | 166/217 |
| 4,497,368 | 2/1985 | Baugh | 166/208 |

*Primary Examiner*—Duane A. Reger
*Assistant Examiner*—Robert J. Oberleitner
*Attorney, Agent, or Firm*—Charles D. Gunter, Jr.

[57] ABSTRACT

A slip gripping mechanism is shown for supporting a string of cylindrical conduit within the interior bore of a circumscribing conduit. An elongate body has a plurality of spaced longitudinal slots at one end. Vertically shiftable slips are carried in the slots by side edges which engage mating profiles formed in the slots. The slots form guideways for the slips for shifting the slips upwardly and outwardly relative to the body between a set position engaging the circumscribing conduit and an unset position. Each slip has an arcuate lower surface and a selected width to thickness ratio to allow controlled flexing of the slip in the direction of the circumscribing conduit as the slip moves to the set position.

9 Claims, 8 Drawing Figures

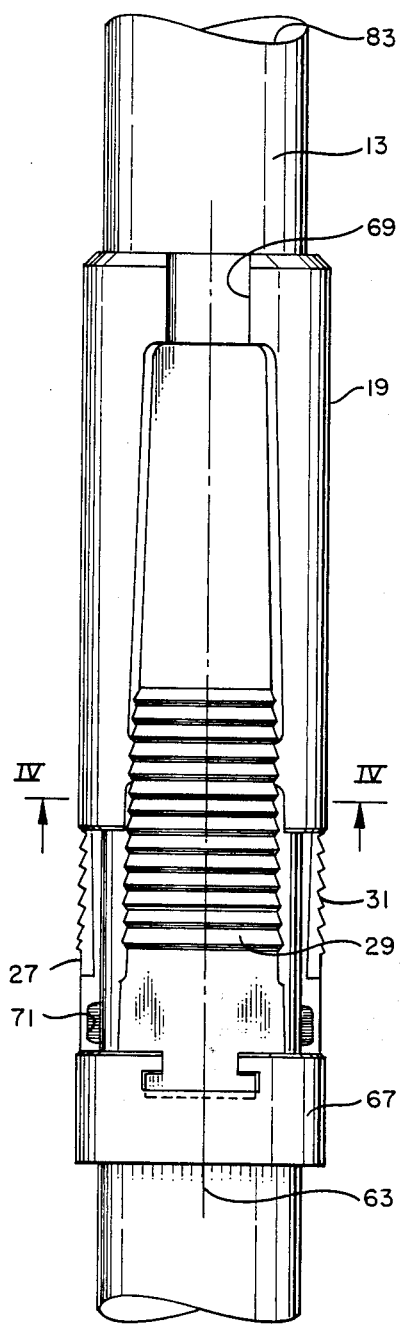
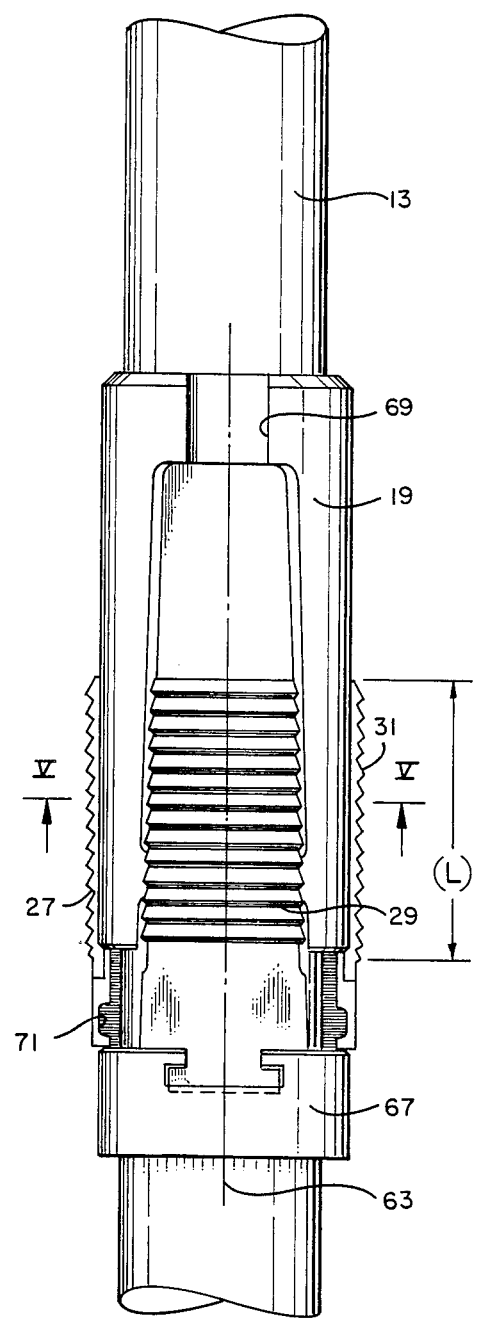
FIG. 2
FIG. 3

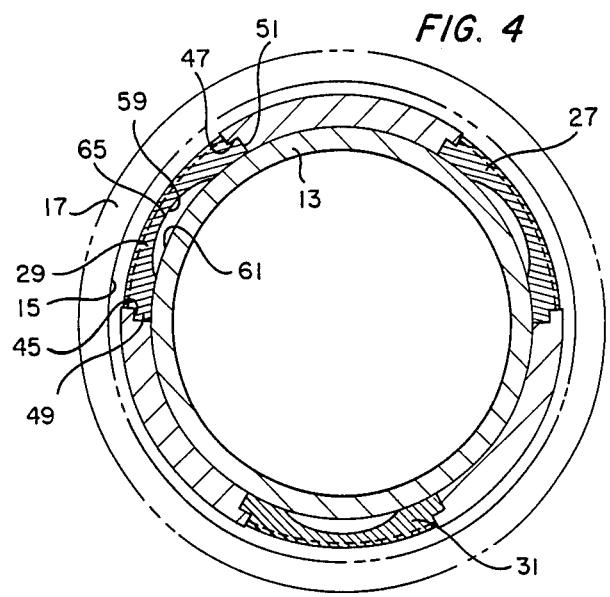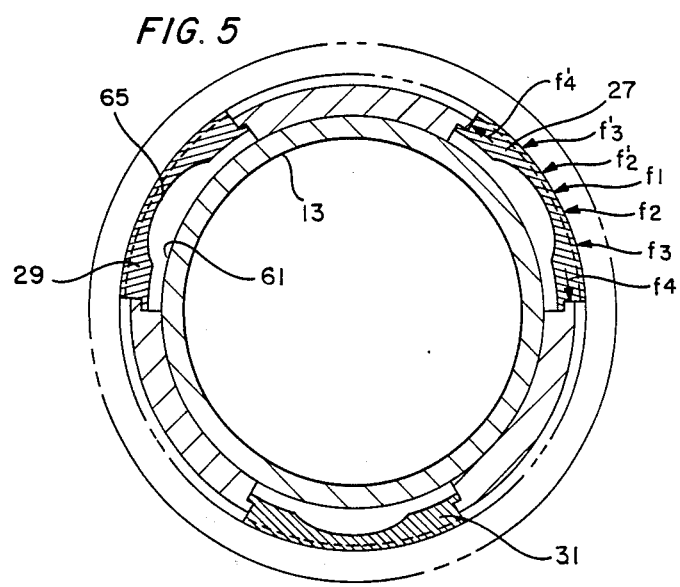

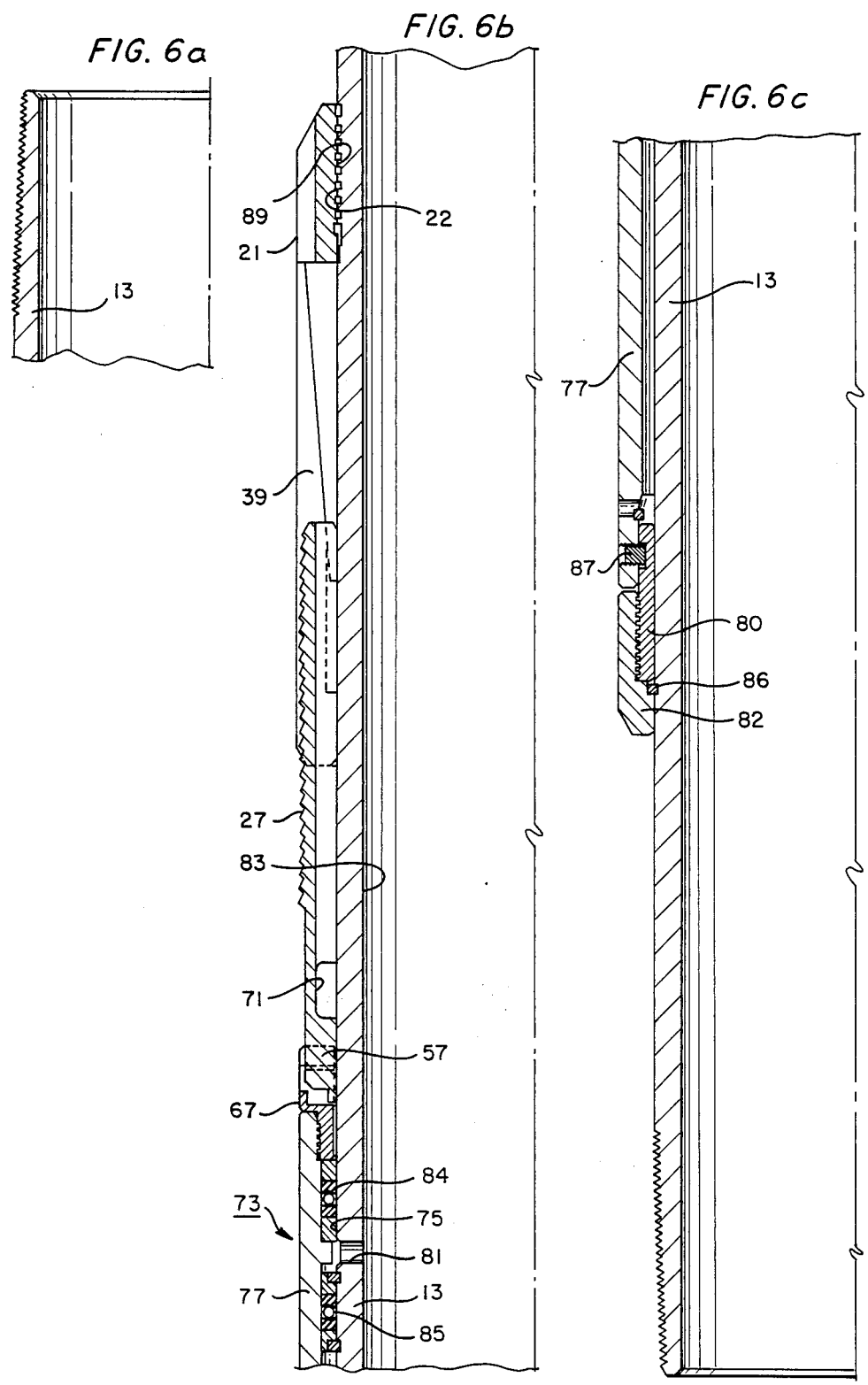

SLIP GRIPPING MECHANISM

BACKGROUND OF THE INVENTION

1. Field of the Invention

This invention relates to improvements in well tools of the type having slip assemblies for grippingly engaging surrounding cylindrical conduits.

2. Description of the Prior Art

Slip assemblies for well packers and liner hangers are actuated in order to support a conduit within the cased bore of a well. Prior art slip gripping mechanisms have generally included a plurality of wedge-shaped slip elements carried in circumferentially spaced-apart relation about a generally conically shaped expander surface on the tool body. More particularly, the lower surface portions of the slips are slidable over complimentary surfaces on the expander so as to cause teeth on the upper surfaces of the slips to be moved between expanded and contracted positions in response to relative axial movement of the slip elements and expander. This relative movement can be induced hydraulically or by mechanical actuation of telescopingly arranged, axially reciprocal members of the tool to which the slips and expander are connected.

One disadvantage in the prior art gripping mechanism lies in the fact that the loading imposed by the cylindrical conduit is transmitted radially from the expanders to the slips and radially into the surrounding well casing. At times, the loading can cause the casing to burst.

Prior art slip gripping mechanisms have generally formed a part of a special hanger body or sub which included an internal mandrel that required consideration in determining the maximum support load of the tool. The hanger body was usually manufactured from special high strength material which differs from the material of the remainder of the cylindrical conduit being supported in the well bore.

The present invention has as its object the provision of a slip gripping mechanism for supporting a string of conduit within the interior bore of a circumscribing conduit which distributes the load being supported in a circumferential direction, rather than imposing a radial load.

Another object of the invention is the provision of a slip gripping mechanism which can be received upon the exterior surface of a standard string of cylindrical conduit and which does not require the presence of a special sub or hanger body within the string.

Additional objects, features and advantages will be apparent in the written description which follows.

SUMMARY OF THE INVENTION

The slip gripping mechanism of the invention is used for supporting a string of cylindrical conduit within the interior bore of a circumscribing conduit. The gripping mechanism preferably includes an elongate tubular body which has a tubular end at one extent with an internal bore, the bore being sized to slidingly receive the external diameter of the cylindrical conduit, whereby the tubular body is received directly on the external diameter of the cylindrical conduit. The tubular body also has an opposite end which is provided with a plurality of circumferentially spaced longitudinally disposed slots. A plurality of circumferentially spaced, vertically shiftable slips are carried by the tubular body in the longitudinally disposed slots. Each slip has side edges which engage mating profiles formed in the longitudinally disposed slots, whereby the slots form guideways for the slips for shifting the slips upwardly and outwardly relative to the body between a set position engaging the surrounding conduit and an unset position. Setting means are provided for effecting opposite relative motion between the tubular body and the slips. The slip dimensions are selected to allow controlled flexing of the slip in the direction of the circumscribing conduit as the slip moves to the set position.

Preferably, each slip has an arcuate lower surface. If an imaginary center line is drawn which bisects the lower surface longitudinally, the lower surface center line is disposed of above the cylindrical conduit exterior surface in both the set and unset positions. The arcuate lower surface, together with a milled bi-pass area provided in the exterior surface of the tubular body together define a fluid flow path between each slip lower surface and the cylindrical conduit and between the bipass area and the surrounding conduit.

Preferably, the slip upper surface is also arcuate whereby a longitudinal center line which bisects the upper surface defines the first point of contact between the slip and surrounding conduit. The slip dimensions are selected to allow controlled flexing of the slip to fully engage the surrounding conduit after initial contact between the slip upper surface center line and the surrounding conduit.

BRIEF DESCRIPTION OF THE DRAWINGS

FIG. 2 is a side view of the gripping mechanism of FIG. 1 in the unset position.

FIG. 3 is a side view similar to FIG. 2, but showing the gripping mechanism in the set position.

FIG. 4 is a cross-sectional view of the gripping mechanism taken along lines IV—IV in FIG. 2.

FIG. 5 is a cross-sectional view of the gripping mechanism taken along lines V—V in FIG. 3.

FIG. 6A is a side, cross-sectional view of the top portion of a gripping mechanism of the invention assembled for actuation with a hydraulic actuating tool.

FIG. 6B is a downward continuation of the tool of FIG. 6A.

FIG. 6C is a downward continuation of the tool of FIG. 6B.

DETAILED DESCRIPTION OF THE INVENTION

Figure 1:
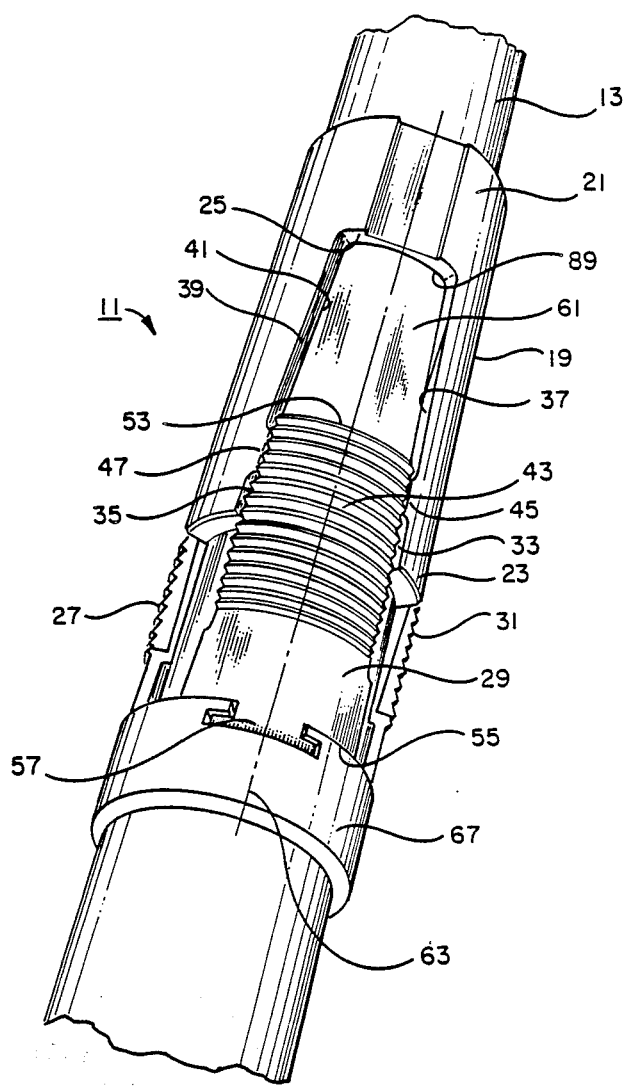
FIG. 1 is a profile, perspective view of the slip gripping mechanism of the invention in the unset position.

FIG. 1 shows a slip gripping mechanism of the invention designated generally as 11. The slip gripping mechanism 11 is used for supporting a string of cylindrical conduit 13 within the interior bore (15 in FIG. 4) of a circumscribing conduit 17. The cylindrical conduit 13 can be, for instance, a string of pipe, casing, tubing, liner, or the like of the type which is to be suspended within a cased well bore.

The slip gripping mechanism preferably includes an elongate tubular body 19 which is adapted to be supported in the string of cylindrical conduit 13. The tubular body 19 has a tubular end 21 at one extent and has an opposite end 23 provided with a plurality of circumferentially spaced longitudinally disposed slots 25. In the embodiment shown in FIG. 1, there are three such slots 25 spaced at 120 degree circumferential locations.

A plurality of circumferentially spaced, vertically shiftable slips 27, 29, 31 are carried by the tubular body 19 in the longitudinally disposed slots 25. Each slip has side edges (33, 35 in FIG. 1) which engage mating profiles (37, 39 in FIG. 1) formed in the longitudinally disposed slots whereby the slots form guideways for the slips for shifting the slips outwardly relative to the tubular body 19 between a set position engaging the circumscribing conduit (FIG. 3) and an unset position (FIG. 2).

As shown in FIG. 1, the mating profiles 37, 39 can comprise ramp surfaces which present a tapered incline or "ramp angle" which is preferably in the range from about 2 to 10 degrees with respect to the slot lower edge surface 41. Any upward vertical travel of the slip 29 within the slot 25 results in outward radial movement of the slip upper surface 43. The slip is retained within the slot 25 as by ears 45, 47 formed in the slot sidewalls which overlay protruding ribs (49, 51 in FIG. 4) which are formed on the slip side edges.

Each slip 29 has a leading edge 53 and a trailing edge 55 which is preferably provided with a T-shaped connecting region 57. As shown in FIG. 4, each slip 29 has an arcuate lower surface 59 which forms a flow area with respect to the external cylindrical surface 61 of the conduit 13. An imaginary center line (63 in FIG. 1) can be drawn which bisects the slip upper and lower surfaces 43, 59 (FIG. 4) longitudinally. The lower surface longitudinal line includes the point 65 in FIG. 4 which is disposed above the cylindrical conduit 13 exterior surface 61 in both the unset position of FIG. 4 and the set position illustrated in FIG. 5. In prior art slip gripping mechanisms, the lower surface 59 generally contacted the expander surface of the hanger body for shifting the slip upwardly and radially outwardly with respect to the hanger body.

As shown in FIG. 1, the T-shaped connecting regions of each slip are preferably received within a mating recess formed in a carrying ring 67. A selected one of the carrying ring 67 and tubular body 19 are fixed against sliding movement on the exterior surface 61 of the cylindrical conduit 13. This can be accomplished, for instance, by threading the interior bore 89 (FIG. 6B) of the tubular end 21 and providing a mating threaded surface 22 on the exterior of the cylindrical conduit 13. The tubular end 21 can also be affixed by means of a shear wire, a body lock ring, by welding or pinning the end 21 to the conduit 13, or by providing a stop collar on the conduit 13 above the tubular end 21.

As best shown in FIGS. 2 and 3, the tubular body 19 is provided with a milled area 69 in alignment with the slip 29. An undercut area 71 is also provided on the lower surface of each slip 27 which together with the milled area 69 defines a fluid flow path between each slip lower surface and the cylindrical conduit 13 and between the by-pass area 69 and the surrounding cased well bore 15.

Setting means are provided for effecting opposite relative movement between the tubular body 19 and the slips 29. As shown in FIGS. 6A-6C, the setting means can include a hydraulic actuating mechanism indicated generally as 73. The hydraulic actuating mechanism includes an annular chamber 75 formed between concentric cylindrical member 77 and cylindrical conduit 13. Cylindrical conduit 77 is initially fixed in position by means of shear pins 87 which are received in a lower collar 80. Lower collar 80 is threadedly connected to an external sleeve 82 which is retained on the exterior surface 61 by a square shear wire 86. A port 81 communicates with the interior 83 of the cylindrical conduit 13. By closing off the interior 83 at a location below the gripping mechanism, the interior can be pressurized, causing hydraulic force to be applied to the piston area 85 of the actuating mechanism. By applying sufficient force, the shear pin 87 can be severed, thereby causing the carrying ring 67 to be forced upwardly to move the slips between the unset position shown in FIG. 2 and the set position shown in FIG. 3. The interior 83 can be closed off, for instance, by dropping a ball through the conduit 13 which is received within a ball catching sub (not shown) located in the conduit 13 below the gripping mechanism.

Although the actuating mechanism 73 is hydraulic in nature, it will be understood by those skilled in the art that the mechanism could be mechanical in nature as well, such as those mechanisms which are set by rotation of the conduit 13 or by the application of weight applied from the well surface to the conduit 13.

As shown in FIG. 1, the gripping mechanism is preferably provided as a unit which is adapted to be received about the external surface 61 of the cylindrical conduit 13 leading to the well surface. It is not necessary that a special sub or hanger body be made up in the conduit string. In other words, the tubular body 19 has a bore 89 which is sized to slidingly receive the external diameter of the conduit 13 whereby the tubular body 19 is received directly on the external diameter of the cylindrical conduit. The body can then be affixed to the conduit by providing appropriate threaded engagement, by welding, shear wires, pins or the like, as has been discussed.

The slip dimensions are selected to allow controlled bending of the slip in the direction of the circumscribing conduit as the slip moves from the unset to the set position. As shown in FIGS. 2 and 3, the imaginary center line 63 which bisects the top arcuate surface of the slip defines the first area of contact with the surrounding casing during the setting step. This area is indicated by the arrow F1 in FIG. 5. As the setting operation continues, the slip flexes and contacts the surrounding casing at points $F_2, F_2'$, followed by points $F_3, F_3'$. This action also results in force being exerted in a circumferential direction, indicated by arrows $F_4, F_4'$. In other words, the setting action of the present slip gripping mechanism results in a compressive circumferential loading on the tubular body and slip edges. In prior art slip gripping mechanisms, the setting load resulted in force being applied radially between the slip and the casing bore. By properly selecting the slip dimensions and ramp angle, the slip will flex and conform to the shape of the casing interior bore without imposing burst loads upon the casing or collapse loads on the cylindrical conduit.

The slip gripping mechanism of the invention is designed to control the maximum load applied to the surrounding casing through the flexing action of the slip. The thickness, width, contour, material, and condition of the slip are controlled to allow control of the loads imparted to the casing by the slip. If the maximum acceptable load on the casing is "P" (pounds per square inch) then the slip is designed to carry the maximum rated load without exceeding "P". As the load increases, the slip gripping mechanism allows the area of the slip in contact with the casing to increase without exceeding load "P". Length (L) (FIG. 3) × width indicated by $F_2'$ to $F_2$ × "P" indicates the maximum load which can be applied to the casing without damage. As the area in contact increases to $L \times F_3'$ to $F_3 \times$ "P", the load which can be supported also increases. The flex of the slip can be controlled to be less than or equal to "P" up to the maximum rated capacity of the slip system. The cylindrical conduit 61 does not support any radial loads and is therefore eliminated from the hanger load limiting factors. The loads can be controlled for use with any casing or conduit grade from steel to plastic without damage to the conduit.

EXAMPLE

A slip gripping mechanism of the invention was tested in 9⅝ inch P-110 oil well casing having a weight/ft. of 53.5 lbs/ft. P-110 casing has a performance rating (P) of 10,900 lbs./sq. in. Each slip in the gripping mechanism had a length of "L" of 7 inches. The distance $F_2'$ to $F_2$ was 2 inches and the distance $F_3'$ to $F_3$ was 4 inches. The area in each slip in contact with the casing is $4 \times 7 = 28$ square inches. The slip gripping mechanism utilized 3 slips mounted at 120 degree circumferential locations, as shown in FIGS. 2 and 3. Thus there were three slips $\times 28$ square inches = 84 square inches total slip area in contact with the surrounding casing. The calculated maximum load which can be supported by the casing is $84 \times 10,900 = 915,600$ lbs. without damage to the casing. Using a 5° ramp angle, this translates into a vertical load capability of 364,000 pounds. In an actual test, a 364,000 pound load was applied to the slip gripping mechanism without damage to the casing.

Because of the flexing action of the slips in conforming to the shape of the circumscribing conduit, the gripping surfaces 43 of the slips can be designed as other than serrated surfaces. For instance, "hard facing" treatments can be applied to the metal surface 43 to provide a roughened surface capable of gripping the circumscribing conduit. Hard facing metal treatments are known to those skilled in the art. For instance, see U.S. Pat. No. 3,800,891 to White et al., issued Apr. 2, 1974, and U.S. Pat. No. 2,939,684 to Payne, issued June 7, 1960. Also, because of the unique action of the slip gripping mechanism, the gripping surface 43 can have a "soft facing" of a deformable nature, such as a layer of copper which would tend to assume the shape of any irregularity of the bore in the circumscribing conduit.

An invention has been provided with several advantages. The slip gripping mechanism can be quickly and easily installed on the exterior of a string of well tubing, casing, or liner. The modular design eliminates the need for a separate liner hanger body or sub to be made up in the pipe string. This eliminates problems in matching threaded connectors in premium threaded pipe strings. It also eliminates the need for a hanger body made of a heavier walled, more expensive pipe material. Because of the unique circumferential loading action of the gripping mechanism, the support load is not imposed radially in toward the pipe. As a result, heavier loads can be supported without the danger of bursting the surrounding casing or the need to provide a heavy walled hanger body. The gripping mechanism of the invention can be provided in a shorter length and yet support heavier loads than prior art devices. The slip upper surface has a smaller radius than the circumscribing conduit diameter and the slip dimensions are selected to allow the slips to flex and conform to the diameter of the surrounding casing. The setting action begins with a line contact at the center of the slip upper surface with the contact moving out evenly on either side of the initial center line contact.

The fluid flow path defined by the slip arcuate lower surfaces and the milled by-pass area on the tubular body does not decrease in size during the setting operation. The slip gripping mechanism is also less expensive to manufacture than prior art devices.

While the invention has been shown in only one of its forms, it is not thus limited but is susceptible to various changes and modifications without departing from the spirit thereof.

We claim:

1. A slip gripping mechanism for supporting a cylindrical conduit which is run from a well surface to a downhole location within the interior bore of a circumscribing conduit in a well bore, the cylindrical conduit being made up of a plurality of joints of pipe, at least one of the joints having a cylindrical external diameter which defines a length between a threaded connecting end at one extent and an opposite threaded connecting end at another extent, the slip gripping mechanism comprising:

an elongate tubular body having a tubular end at one extent with an internal bore, the bore being sized to slidingly receive the cylindrical external diameter of one of the joints of the cylindrical conduit which is to be supported from the circumscribing conduit whereby the tubular body is received directly on the cylindrical external diameter of the cylindrical conduit between the threaded connecting ends thereof, the tubular body having an opposite end provided with a plurality of circumferentially spaced longitudinally disposed slots;

a plurality of circumferentially spaced, vertically shiftable slips carried by the tubular body in the longitudinally disposed slots, each slip having side edges which engage mating profiles formed in the longitudinally disposed slots whereby the slots form guideways for the slips for shifting the slips upwardly and outwardly relative to the body between a set position engaging the circumscribing conduit and an unset position; and setting means for effecting opposite relative motion between the tubular body and the slips.

2. A slip gripping mechanism for supporting a string of cylindrical conduit within the interior bore of a circumscribing conduit, comprising:

an elongate body adapted to be supported in the string of cylindrical conduit, the elongate body having a tubular end at one extent and having an opposite end provided with a plurality of circumferentially spaced longitudinally disposed slots, the slots having lower edge surfaces;

a plurality of circumferentially spaced, vertically shiftable slips carried by the tubular body in the longitudinally disposed slots, each slip having side edges which engage mating profiles formed in the longitudinally disposed slots, the mating profiles comprising ramp surfaces which present a tapered incline in the range of 2 to 10 degrees with respect to the slot lower edge surface whereby the slots form guideways for the slips for shifting the slips upwardly and outwardly relative to the body between a set position engaging the circumscribing conduit and an unset position;

setting means for effecting opposite relative motion between the tubular body and the slips; and wherein each slip has an arcuate lower surface as defined radially from the longitudinal axis of the cylindrical conduit and wherein an imaginary center line can be drawn which bisects the lower surface longitudinally, the lower surface center line being disposed above the cylindrical conduit exterior surface in both the set and unset positions, wherein movement of the slips upwardly and outwardly relative to the body within the longitudinally disposed slots serves to impose circumferential loading upon the tubular body.

3. A slip gripping mechanism for supporting a cylindrical conduit which is run from a well surface to a downhole location within the interior bore of a circumscribing conduit in a well bore, the cylindrical conduit being made up of a plurality of joints of pipe, at least one of the joints having a cylindrical external diameter which defines a length between a threaded connecting end at one extent and an opposite threaded connecting end at another extent, the slip gripping mechanism comprising:

an elongated tubular body having a tubular end at one extent with an internal bore, the bore being sized to slidingly receive the cylindrical external diameter of one of the joints of the cylindrical conduit which is to be supported from the circumscribing conduit whereby the tubular body is received directly on the cylindrical external diameter of the cylindrical conduit between the threaded connecting ends thereof, the tubular body having an opposite end provided with plurality of circumferentially spaced longitudinally disposed slots, the slots having lower edge surfaces;

a plurality of circumferntially spaced, vertically shiftable slips carried by the tubular body in the longitudinally disposed slots, each slip having side edges which engage mating profiles formed in the longitudinally disposed slots, the mating slots comprising ramp surfaces which present a tapered incline in the range of 2 to 10 degrees with respect to the slot lower edge surfaces whereby the slots from guideways for the slips for shifting the slips upwardly and outwardly relative to the body between a set position engaging the circumscribing conduit and an unset position;

setting means for effecting opposite relative motion between the tubular body and the slips; and wherein each slip has an arcuate lower surface as defined radially from the longitudinal axis of the cylindrical conduit and wherein an imaginary center line can be drawn which bisects the lower surface longitudinally, the lower surface center line being disposed above the cylindrical conduit exterior surface in both the set and unset positions, wherein movement of the slips upwardly and outwardly relative to the body within the longitudinally disposed slots serves to impose circumferential loading upon the tubular body.

4. A slip gripping mechanism for supporting a cylindrical conduit within the interior bore of a circumscribing conduit, comprising:

an elongate body adapted to be supported in the string of cylindrical conduit, the elongate body having a tubular end at one extent and having an opposite end provided with a plurality of circumferentially spaced longitudinally disposed slots;

a plurality of circumferentially spaced, vertically shiftable slips carried by the tubular body in the longitudinally disposed slots, each slip having a leading edge and a trailing edge and having side edges which engage mating profiles formed in the longitudinally disposed slots whereby the slots form guideways for the slips for shifting the slips upwardly and outwardly relative to the body between a set position engaging the circumscribing conduit and an unset position;

setting means for effecting opposite relative motion between the tubular body and the slips; and wherein each slip has an arcuate lower surface as defined radially from the longitudinal axis of the cylindrical conduit and wherein a by-pass groove is provided in the exterior surface of the tubular body in longitudinal alignment with each slip to thereby define a fluid flow path between each slip lower surface and the cylindrical conduit and between the by-pass groove and the circumscribing conduit and wherein each slip lower surface is provided with an undercut area in the region of the trailing edge which, along with the arcuate lower surface and by-pass groove in the exterior surface of the tubular body define the fluid flow path.

5. The slip gripping mechanism of claim 4, wherein the cross-sectional flow area of the fluid flow path is approximately equal in both the set and the unset positions of the gripping mechanism.

6. A slip gripping mechanism for supporting a cylindrical conduit having a cylindrical exterior surface within the interior bore of a circumscribing conduit, comprising:

an elongate body adapted to be supported in the string of cylindrical conduit, the elongate body having a tubular end at one extent having an opposite end provided with a plurality of circumferentially spaced longitudinally disposed slots, the slots having lower edge surfaces;

a plurality of circumferentially spaced, vertically shiftable slips carried by the tubular body in the longitudinally disposed slots, each slip having side edges which engage mating profiles formed in the longitudinally disposed slots, the mating slots comprising ramp surfaces which present a tapered incline in the range of 2 to 10 degrees with respect to the slot lower edge surface whereby the slots form guideways for the slips for shifting the slips upwardly and outwardly relative to the body between unset positions and set positions engaging the circumscribing conduit;

setting means for effecting opposite relative motion between the tubular body and the slips; and wherein each slip has an arcuate upper and an arcuate lower surface as defined radially from the longitudinal axis of the cylindrical conduit and wherein a longitudinal center line can be drawn which bisects the upper and lower surfaces, the lower surface center line being disposed above the cylindrical conduit exterior surface in both the set and unset positions to thereby allow controlled flexing of the slip to fully engage the circumscribing conduit only after initial contact between the slip upper surface center line and the circumscribing conduit.

7. The slip gripping mechanism of claim 6, wherein said slip upper surfaces are provided with a hard facing treatment to provide a roughened surface capable of gripping the circumscribing conduit.

8. The slip gripping mechanism of claim 6, when said slip upper surfaces are provided with a soft facing of a deformable material which assumes the shape of the circumscribing conduit.

9. The slip gripping mechanism of claim 6, wherein the slip arcuate upper surfaces have a smaller radius, as defined radially from the longitudinal axis of the cylindrical conduit, than the radius which defines the internal diameter of the circumscribing conduit, to thereby allow the slips to flex and conform to the diameter of the circumscribing conduit as the slips move to the set position.

* * * * *